United States Patent
Rudolph et al.

(10) Patent No.: US 9,355,793 B2
(45) Date of Patent: May 31, 2016

(54) USER INTERFACE OF A VEHICLE

(75) Inventors: Aaron Rudolph, Montana, CA (US); Heiko Maiwand, Foster City, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 1007 days.

(21) Appl. No.: 13/538,280

(22) Filed: Jun. 29, 2012

(65) Prior Publication Data

US 2014/0001834 A1    Jan. 2, 2014

(51) Int. Cl.
| | |
|---|---|
| *B60L 1/14* | (2006.01) |
| *H01H 13/00* | (2006.01) |
| *B60R 25/20* | (2013.01) |
| *B60K 28/06* | (2006.01) |
| *B60K 37/06* | (2006.01) |
| *B60K 28/04* | (2006.01) |
| *B60K 28/12* | (2006.01) |

(52) U.S. Cl.
CPC .............. *H01H 13/00* (2013.01); *B60K 28/063* (2013.01); *B60K 37/06* (2013.01); *B60R 25/2063* (2013.01); *B60K 28/04* (2013.01); *B60K 28/12* (2013.01); *B60K 2350/2004* (2013.01); *B60K 2350/2039* (2013.01)

(58) Field of Classification Search
CPC .............................. B60R 25/2063; H01H 3/00
USPC ......................... 307/9.1, 10.6, 10.8
See application file for complete search history.

(56) References Cited

U.S. PATENT DOCUMENTS

| | | | |
|---|---|---|---|
| 6,529,123 B1 * | 3/2003 | Paul, Jr. ...................... | 340/425.5 |
| 2006/0082545 A1 * | 4/2006 | Choquet et al. ............... | 345/156 |
| 2009/0128308 A1 * | 5/2009 | Chen .................... | B60R 25/2009 340/425.5 |

FOREIGN PATENT DOCUMENTS

| | | | | |
|---|---|---|---|---|
| DE | 10 2008 004970 | | 7/2009 | |
| KR | 102009129595 | * | 6/2001 | .............. F02N 15/00 |
| KR | 1020090129595 | * | 6/2011 | .............. F02N 15/00 |

* cited by examiner

*Primary Examiner* — Carlos Amaya
(74) *Attorney, Agent, or Firm* — Muncy, Geissler, Olds & Lowe, P.C.

(57) ABSTRACT

A method for operating a user interface of a vehicle, a user interface for a vehicle, and a vehicle are described.

15 Claims, 4 Drawing Sheets

USER INTERFACE OF A VEHICLE

BACKGROUND OF THE INVENTION

1. Field of the Invention

The present invention relates to a method for operating a user interface of a vehicle, a user interface for a vehicle, and a vehicle comprising the user interface.

2. Description of the Background Art

Keyless ignition systems in vehicles, e.g. passenger vehicles or commercial road vehicles, are widely used. Most of the interaction with these systems is centred around a so-called start/stop button. This button, usually embodied as a push-button, is used to conditionally move the vehicle between many different states, e.g. ignition on, running, off and so on. However, all these actions are performed without any feedback or indication to the user. Because of this lack of feedback, new users often find the interaction with these systems difficult to understand. This lack of feedback may already exist in conventional vehicles with a combustion engine, but may create additional problems on electric vehicles or vehicles equipped with systems to turn off the engine on red lights automatically. In these cases, because of lack of noise and/or vibration or other means for the driver to know whether the engine is running or not, the behaviour of the start/stop button may be even more unclear.

SUMMARY OF THE INVENTION

According to an embodiment, a method for operating a user interface of a vehicle is provided. The user interface comprises a push-button which comprises a user-actuable push-element, an illumination, and a controllable drive adapted to move the push-element. According to the method, the push-element is automatically positioned by automatically controlling the drive depending on an operational state of the vehicle. Furthermore, the illumination is automatically controlled depending on the operational state of the vehicle.

According to another embodiment, a user interface for a vehicle is provided which comprises a push-button and a control unit. The push-button comprises a user-actuable push-element, an illumination, and a controllable drive adapted to move the push-element. The control unit is coupled to the push-button and configured to receive an operational state of the vehicle. The control unit is furthermore configured to position the push-element by controlling the drive depending on the operational state of the vehicle, and to control the illumination depending on the operational state of the vehicle.

According to a further embodiment of the present invention, a vehicle is provided which comprises a push-button and a control unit coupled to the push-button. The push-button comprises a user-actuable push-element, an illumination, and a controllable drive adapted to move the push-element. The control unit is configured to receive an operational state of the vehicle and to position the push-element by controlling the drive depending on the operational state of the vehicle. Furthermore, the control unit is configured to control the illumination depending on the operational state of the vehicle.

Although the specific features described in the above summary and in the following detailed description are described in connection with specific embodiments, it is to be understood that the features of the embodiments described can be combined with each other unless it is noted otherwise.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
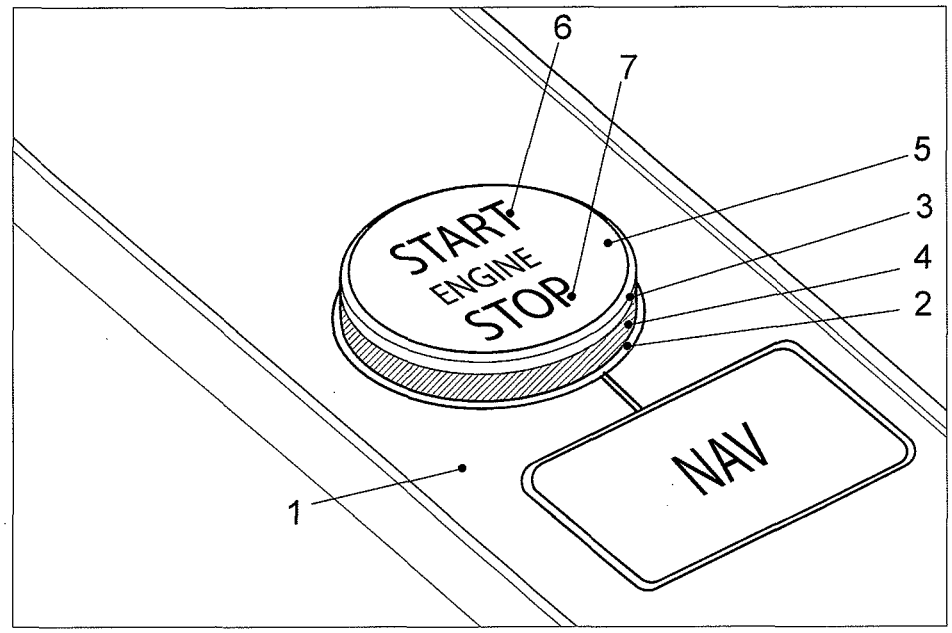
FIG. 1 shows a push-button of a user interface according to an embodiment of the present invention in a first position.

In the following, exemplary embodiments of the invention will be described in more detail. It is to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that in the following detailed description of the various embodiments, any direct connection or coupling between functional blocks, devices, components or other physical or functional units shown in the drawings or described herein could also be implemented in an indirect connection or coupling. Same reference signs in the various instances of the drawings refer to similar or identical components. It is furthermore to be understood that the features of the various exemplary embodiments described herein may be combined with each other unless specifically noted otherwise.

According to an embodiment of the present invention, a method for operating a user interface of a vehicle, especially e.g. a user interface comprising a start/stop button of a keyless ignition system of the vehicle, is provided. The user interface comprises a push-button which comprises a user-actuable push-element, an illumination, and a controllable drive adapted to move the push-element. According to the method, the push-element is automatically positioned by automatically controlling the drive depending on an operational state of the vehicle. The push-element may be movable in a push-direction from a non-actuated position to an actuated position upon user actuation. The drive may be adapted to move the push-element such that the non-actuated position is varied in the push-direction. However, the push-element may be pushed by the user independent from the non-actuated position which is currently selected by the drive. By motion of the push-element, the user gets an invitation to interact with the push-button and a feedback communicating the status of the vehicle. Furthermore, according to the method, the illumination is automatically controlled depending on the operational state of the vehicle. The illumination may comprise e.g. illuminable symbols on the push-surface of the push-element and an illuminable ring at a circumferential surface of the push-element or the push-button. The illuminable ring may be controllable in a full colour spectrum to display a current status, transitions and confirmations of actions. A current status may be shown by lighting the ring in a particular colour. Transitions and pending transitions to different states may be shown by fading between two different colours. Confirmations of actions, e.g. starting the vehicle, may be shown by flashing two different colours. The illuminable symbols may comprise e.g. the characters "start" and "stop". By illuminating the characters an action induced by pressing the push-button may be indicated.

According to an embodiment, the operational state of the vehicle comprises a locking state of a door of the vehicle, an opening state of a door of the vehicle, an actuation state of a brake pedal of the vehicle, a current speed of the vehicle, a gear selection of the gear selector of the vehicle, an actuation state of the push-button, and/or a seat occupation of a driver seat of the vehicle. Due to security, operational and comfort reasons, several operational states of the vehicle may influence the starting and stopping of the engine of the vehicle. As will be shown in detail in connection with FIG. 6, these operational states may be intuitively presented to the user by the above-described illumination and motion of the push-button.

According to another embodiment, the user interface comprises a proximity sensor for a contact-free detection when a user is approaching the push-button. Based on the detection that the user approaches the push-button, the push-element may be automatically positioned by automatically controlling the drive or the illumination may be automatically controlled. The proximity sensing may be accomplished by a capacitive proximity sensing in which a capacity of a capacitor arranged near the push-button is influenced when a user's hand or a user's finger is approaching. By changing a position of the push-element or changing the illumination of the push-button already when the user is approaching the push-button before contacting the push-button, a preview of what will happen if the user presses the button may be presented to the user. E.g. when the user has their foot on the brake such that the condition is met for "car ready to start" and a user's finger is detected within the proximity of the push-button, the illuminable ring of the push-element may be illuminated with bright green to indicate that pressing the button will start the vehicle. Similarly, hovering the user's finger over the button when the vehicle is ready to be stopped may cause the illuminable ring to glow in bright red, indicating that pressing the button will stop the engine.

According to a further embodiment, upon user actuation of the push-element, a state of an engine of the vehicle may be changed, e.g. a starting of the engine may be prepared. In case of an electric vehicle comprising an electrical engine for propelling the vehicle, an electrical energy flow to the engine may be established such that upon actuating an accelerator pedal of the vehicle, the vehicle will start moving. In case of a vehicle with a combustion engine, the engine may be started or stopped upon actuation of the push-element. In a vehicle comprising a system for automatically starting and stopping the combustion engine when the vehicle is stopped, e.g. at a red light, upon user actuation of the push-element, an automatic starting of the engine may be allowed or inhibited.

FIG. 1 shows a perspective view of a push-button 2 arranged in a dashboard or central console 1 of a vehicle. The push-button 2 comprises a push-element 3 with a push-surface 5. The push-surface 5 may be pressed down by a user operating the push-button 2. At a circumferential surface of the push-element 3, an illuminable ring 4 is provided. The illuminable ring 4 may be illuminated by a light source coupled by a light guide to the illuminable ring 4. The light source may comprise e.g. light emitting diodes (LED) which are adapted to provide light in different intensities and colours. On the push-surface 5, illuminable symbols 6, 7 may be arranged, e.g. as shown in FIG. 1, the letters "start" and the letters "stop". As described above, the illuminable symbols 6, 7 may be illuminated by corresponding light sources with varying intensity and/or colours.

Figure 2:
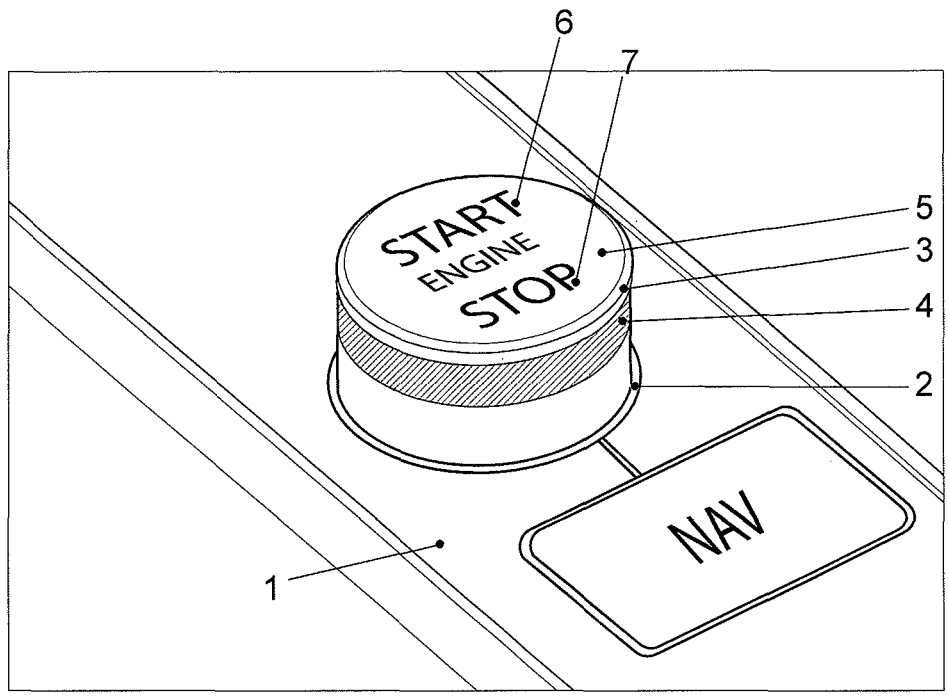
FIG. 2 shows the push button of FIG. 1 in a second position.

The push-element 3 may be pushed down by an actuation of the user pressing the push-surface 5 and may resiliently move back to the non-pressed position. The non-pressed position may be varied by a drive such that a positioning of the push-element 3 may be varied in the push-direction. FIG. 2 shows the push-element 3 in an elevated position. However, the push-element 3 can be pushed down by a user in the position shown in FIG. 1 as well as in the position shown in FIG. 2.

Figure 3:
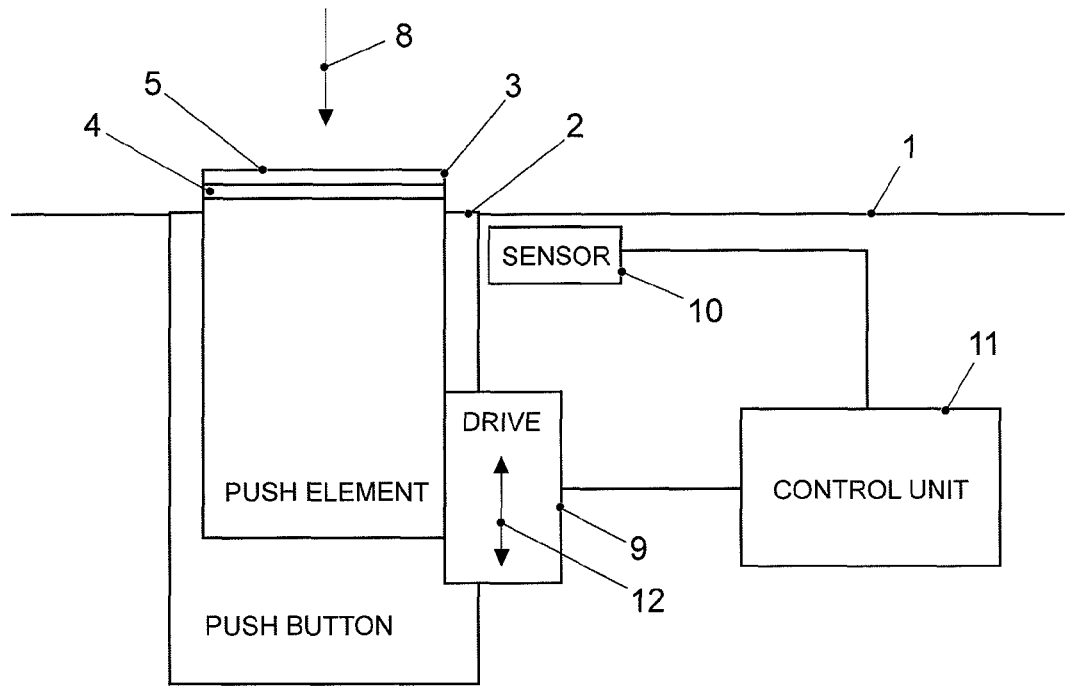
FIG. 3 shows a schematic view of a user interface according to an embodiment of the present invention.

FIG. 3 shows a schematic sectional view of the push-button 2 arranged in the dashboard or central console 1. The push-element 3 may be pushed down in the direction of arrow 8 by a user pressing on the push-surface 5. A drive 9, which is controlled by a control unit 11, may vary the non-pressed position of the push-element 3 in the direction of arrow 12. The drive 9 may comprise an electric motor and a gear for moving the push-element 3 in the direction of arrow 12. Thus, a position or level of the push-element 3 can be automatically varied under control of the control unit 11. The control unit 11 may be coupled to an electronic system of the vehicle, e.g. a so-called car bus system of the vehicle, to receive operational states of the vehicle, e.g. a locking or opening state of a door of the vehicle, an actuation state of a brake pedal of the vehicle, a current speed of the vehicle, a gear selection of a gear selector of the vehicle, an actuation state of the push-button 2 or a seat occupation of a driver seat of the vehicle. Based on these operational states, the control unit 11 changes the position of the push-element via the drive 9. Furthermore, the control unit 11 controls illumination of the illuminable ring 4 and the symbols 6, 7 on the push-surface 5.

Figure 4:
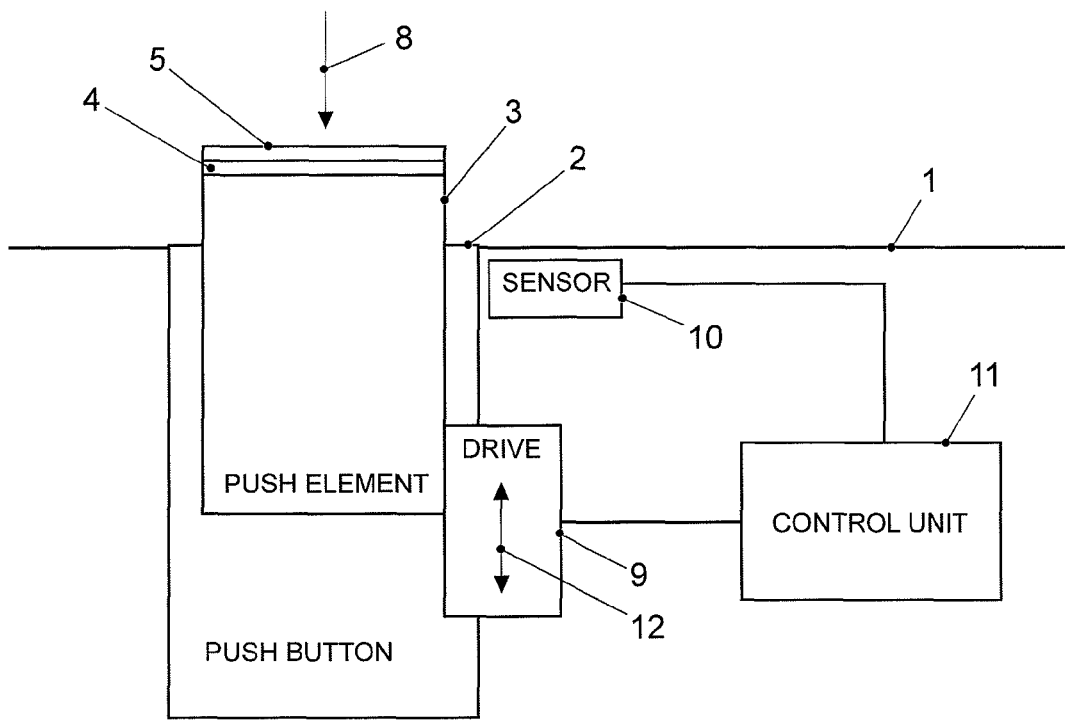
FIG. 4 shows the user interface of FIG. 3 with a push-element in a different position.

FIG. 4 shows a state of the push-button 2, in which the push-element 3 has been moved by the drive 9 to a higher position such that the push-element 3 protrudes significantly more from a surface of the dashboard or central console 1 than in FIG. 3. A moving range of the push-element 3 in the direction of arrow 12 may be a few millimeters, e.g. up to 20 millimeters.

Near the push-button 2 a proximity sensor 10 may be arranged, which is also coupled to the control unit 11. The proximity sensor 10 may be adapted to detect when a user's hand or a user's finger is approaching the push-button 2. An exemplary embodiment for controlling the drive 9 and the illumination of the ring 4 and the symbols 6, 7 will be described in more detail in connection with FIG. 6.

Figure 5:
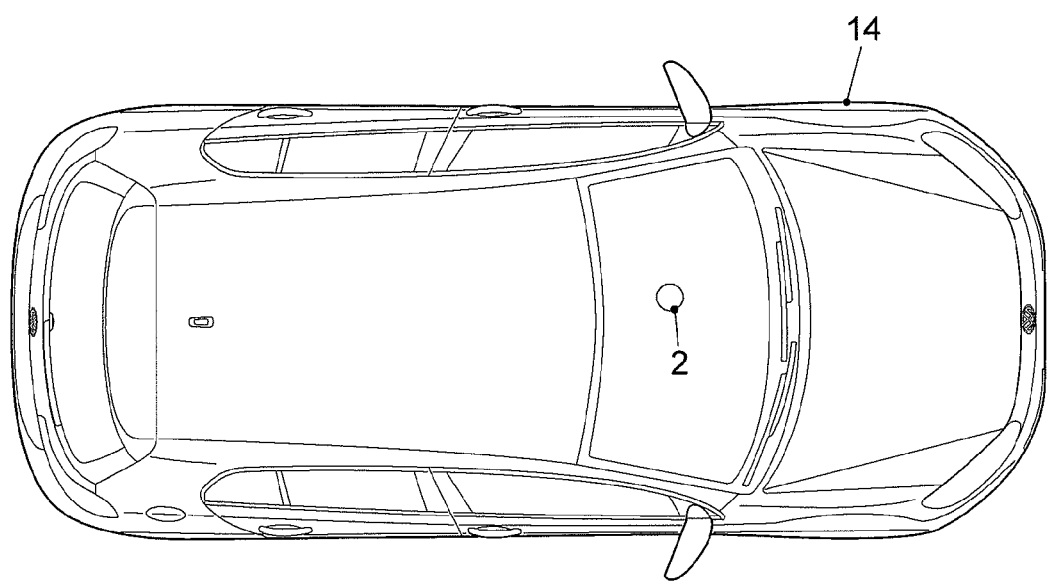
FIG. 5 shows a vehicle according to an embodiment of the present invention.

FIG. 5 shows an exemplary arrangement of the push-button 2 in a dashboard or a central console of a vehicle 14.

Figure 6:
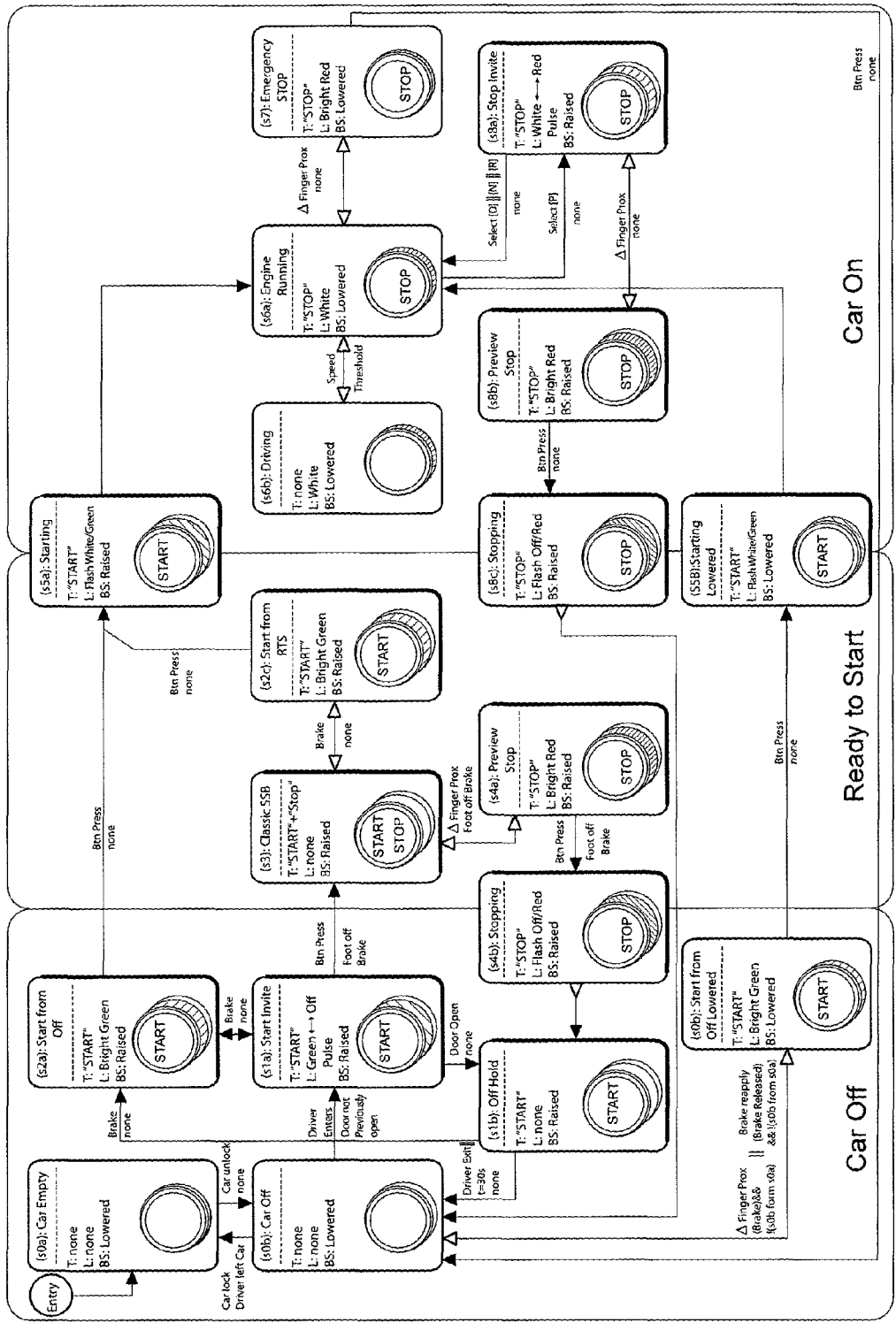
FIG. 6 shows a state diagram describing an operation of a vehicle user interface according to an embodiment of the present invention.

FIG. 6 shows a state diagram for operating the above described push-button 2 depending on operational states of the vehicle and depending on a user interaction with the push-button 2. In FIG. 6, for each state the following information is provided: on the top, a state reference starting with the lower letter "s" is provided in brackets followed by a state headline. The next line starting with "T:" indicates which of the symbols 6, 7 on the push-surface 5 of the push-element 3 is illuminated. In the next line starting with "L:", an illumination of the illuminable ring 4 is indicated. The next line starting with "BS:" indicates if the push-element 3 is in the lowered position, as e.g. indicated in FIGS. 1 and 3, or if the push-element 3 is in the raised position, as indicated in FIGS. 2 and 4. The arrows between the states indicate state transitions and are provided with textual information indicating which conditions of operational states of the vehicle or user interactions have to be fulfilled for performing the corresponding state transitions.

Exemplary state transitions will be explained in detail in the following.

In state s0a the car is empty and locked. The illumination of the push-button is dark and the push-element is in the lowered position. After unlocking the car, the driver enters the car and upon detecting that the driver is sitting on the driver's seat, state s1a is reached to invite the driver to start the vehicle by illuminating the "start" symbol, periodically increasing and decreasing a green light at the illuminable ring, and raising the push-element. Periodically and slowly increasing and decreasing the illumination is indicated in FIG. 6 by the term "pulse". A pulsed illumination attracts attention and indicates that some more operations have to be done before the vehicle can be started. When the user activates the brake pedal of the vehicle, state s2a is entered and the illuminable ring is illuminated with a constant bright green indicating that the engine will be started by pressing the push-button. By pressing the push-button (Btn Press) state s5a is entered during starting the engine. In this state, the illuminable ring changes its illumination abruptly between green and white, which is indicated by the term "flash". The flashing colour change indicates that the engine is in a transition, e.g. during starting or stopping the engine. When the engine is running, state s6a is entered, in which the push-button is in its lowered position and the illuminable ring is illuminated in a white light indicating that the engine is running. The symbol "stop" is additionally illuminated indicating that the engine may be stopped by pressing the push-button. Then the driver may start driving the vehicle.

When a certain speed threshold of the vehicle is exceeded, e.g. 5 or 10 mph, the state s6b is entered and the illumination of the symbol "stop" is switched off. The white illuminated ring still indicates that the engine is running. When the vehicle is slowed down and the speed is below the speed threshold, the state s6a is entered again and the symbol "stop" is illuminated. When the gear selector is moved into the parking position (select [P]), state s8a is entered, in which the user is invited to stop the engine. Therefore, the symbol "stop" is illuminated, the push-button is raised and the illuminable ring is pulsing between white and red light. When a finger of the user approaches the push-button, which is sensored by the sensor 10 as described above in connection with FIGS. 3 and 4, the illumination of the ring changes to a bright red in state s8b to indicate a preview of what will happen when the user is pushing the push-button. When the user moves the finger away from the push-button, state s8a is entered again. When the user presses the button, the state s8c is entered, which is indicated by a flashing of the ring with a change between red light and no light. When the engine has stopped, state s0b is entered, in which the illumination of the symbol and the ring is switched off and the push-element is in its lowered position.

While exemplary embodiments have been described above, various modifications may be implemented in other embodiments. E.g., as indicated in FIG. 6, much more states may be entered depending on operational states of the vehicle and interactions between the user and the push-button and the proximity sensor.

Finally, it is to be understood that all the embodiments described above are considered to be comprised by the present invention as it is defined by the appended claims.

What is claimed is:

1. A method for operating a user interface of a vehicle, the user interface comprising a push button, the push button comprising a user actuatable push element, an illumination, and a controllable drive adapted to move the push element, the method comprising:

positioning the push element by automatically controlling the drive depending on an operational state of the vehicle; and automatically controlling the illumination depending on the operational state of the vehicle, wherein the illumination and positioning of the push element indicate an operational capability of the vehicle.

2. The method according to claim 1, wherein the push element is movable in a push direction from a non-actuated position to an actuated position upon user actuation, and wherein positioning the push element comprises automatically varying the non-actuated position in the push direction.

3. The method according to claim 1, wherein the operational state of the vehicle comprises:

a locking state of a door of the vehicle;
an opening state of a door of the vehicle;
an actuation state of a brake pedal of the vehicle;
a current speed of the vehicle;
a gear selection of a gear selector of the vehicle;
an actuation state of the push button; and/or
a seat occupation of a driver seat of the vehicle.

4. The method according to claim 1, wherein the user interface further comprises a proximity sensor for a contact free detection of a user approaching the push button, the method further comprising:

positioning the push element by automatically controlling the drive depending on the contact free detection of the user approaching the push button, and/or automatically controlling the illumination depending on the contact free detection of the user approaching the push button.

5. The method according to claim 1, wherein the illumination comprises an illuminable symbol on a push surface of the push element and/or an illuminable ring at a circumferential surface of the push element.

6. The method according to claim 1, further comprising:

preparing a starting of an engine of the vehicle upon user actuation of the push element;

starting an engine of the vehicle upon user actuation of the push element;

stopping an engine of the vehicle upon user actuation of the push element;

allowing an automatic starting of an engine of the vehicle upon user actuation of the push element; and/or inhibiting an automatic starting of an engine of the vehicle upon actuation of the push element.

7. The method of claim 1, wherein, if the vehicle is locked, unoccupied, or above a threshold speed, no operational capability is indicated.

8. The method of claim 1, wherein the position of the push element is a height of the push element, and wherein the controlled illumination is an illumination color.

9. The method of claim 8, wherein the controlled illumination is a pulsed illumination.

10. The method of claim 1, further comprising:

controlling illumination of a START symbol and illumination of a STOP symbol.

11. The user interface of claim 1, wherein the push element is a button.

12. A vehicle, comprising:

a push button comprising a user actuatable push element, an illumination, and a controllable drive adapted to move the push element; and a control unit coupled to the push button and configured to receive an operational state of the vehicle, configured to position the push element by controlling the drive depending on the operational state of the vehicle, and configured to control the illumination depending on the operational state of the vehicle.

13. The vehicle according to claim 12, further comprising an engine for propelling the vehicle, wherein the control unit is further configured to:
prepare a starting of the engine of the vehicle upon user actuation of the push element;
start the engine of the vehicle upon user actuation of the push element;
stop the engine of the vehicle upon user actuation of the push element;
allow an automatic starting of the engine of the vehicle upon user actuation of the push element; and/or
inhibit an automatic starting of the engine of the vehicle upon actuation of the push element.

14. The vehicle according to claim 13, wherein the engine comprises an electrical engine.

15. A method for operating a user interface of a vehicle, the user interface comprising a push button, the push button comprising a user actuatable push element, an illumination, and a controllable drive adapted to move the push element, the method comprising:
positioning the push element by automatically controlling the drive depending on an operational state of the vehicle; and
automatically controlling the illumination depending on the operational state of the vehicle,
wherein the illumination and positioning of the push element indicate an operational capability of the vehicle,
wherein the position of the push element is a height of the push element, and wherein the controlled illumination is an illumination color,
wherein the controlled illumination is a pulsed illumination, and wherein the combination of the height of the push element, the illumination color and the pulsed illumination indicate a specific operational state.

* * * * *